(12) United States Patent
Ichikawa et al.

(10) Patent No.: US 7,136,091 B2
(45) Date of Patent: Nov. 14, 2006

(54) VEHICLE IMAGING APPARATUS, VEHICLE MONITORING APPARATUS, AND REARVIEW MIRROR

(75) Inventors: Takashi Ichikawa, Niwa-gun (JP); Terumasa Suyama, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 817 days.

(21) Appl. No.: 10/217,733

(22) Filed: Aug. 13, 2002

(65) Prior Publication Data

US 2003/0040851 A1 Feb. 27, 2003

(30) Foreign Application Priority Data

Aug. 21, 2001 (JP) ............................. 2001-250117

(51) Int. Cl.
- *H04N 7/18* (2006.01)
- *G08G 1/017* (2006.01)
- *B60Q 1/00* (2006.01)

(52) U.S. Cl. .................... 348/148; 340/937; 340/425.5

(58) Field of Classification Search ................. 348/36, 348/143, 148, 149; 340/937, 425.5, 437; 359/727

See application file for complete search history.

(56) References Cited

U.S. PATENT DOCUMENTS

| | | | |
|---|---|---|---|
| 4,549,208 A * | 10/1985 | Kamejima et al. .......... 348/147 |
| 5,563,650 A * | 10/1996 | Poelstra .................... 348/36 |
| 5,680,123 A * | 10/1997 | Lee ............................. 340/937 |
| 6,426,774 B1 * | 7/2002 | Driscoll et al. ............. 348/335 |
| 6,693,518 B1 * | 2/2004 | Kumata et al. ............. 340/435 |
| 6,693,519 B1 * | 2/2004 | Keirstead .................... 340/435 |
| 6,738,089 B1 * | 5/2004 | Silc ............................ 348/148 |
| 2002/0011927 A1 * | 1/2002 | Lang et al. ................. 340/436 |

FOREIGN PATENT DOCUMENTS

| | | | |
|---|---|---|---|
| JP | 09118178 A | * | 5/1997 |
| JP | 11-078693 | | 3/1999 |
| JP | 3067896 | | 4/2000 |
| JP | 2000-185597 | | 7/2000 |
| JP | 2001-180375 | | 7/2001 |
| JP | 2001-180378 | | 7/2001 |

* cited by examiner

*Primary Examiner*—Gims Philippe
*Assistant Examiner*—Erick Rekstad
(74) *Attorney, Agent, or Firm*—Synnestvedt & Lechner LLP

(57) ABSTRACT

A vehicle imaging apparatus for generating a picture of a wide are in an inexpensive manner without affecting the aesthetic appeal of the vehicle. The vehicle imaging apparatus generates a picture of a predetermined area outside a vehicle having a rearview mirror. The vehicle imaging apparatus includes a reflection mirror arranged in the rearview mirror and having a curved surface. An imaging device is arranged in the rearview mirror to generate a picture from an image reflected on the reflection mirror. The rearview mirror is located on the passenger side of the vehicle and has a housing. The reflection mirror is arranged in a lower portion of the rearview mirror so that an upper portion of the reflection mirror is covered by the housing and a portion excluding the upper portion is exposed.

5 Claims, 5 Drawing Sheets

VEHICLE IMAGING APPARATUS, VEHICLE MONITORING APPARATUS, AND REARVIEW MIRROR

BACKGROUND OF THE INVENTION

The present invention relates to a vehicle imaging apparatus for generating an image of a predetermined area outside a vehicle, a vehicle monitoring apparatus employing such imaging apparatus, and a rearview mirror.

When driving a vehicle from a parked state, a driver must be check the surrounding of the vehicle and be aware of obstacles. However, there are spots beside the passenger seat or in front and rear of the vehicle that cannot be seen by the driver from the driver's seat. Thus, the driver should look around the vehicle and check the vehicle surrounding before starting the vehicle. This may be burdensome.

In the prior art, an imaging apparatus, for example, a vehicle monitoring apparatus that shows pictures of spots difficult to see from the driver's seat on a monitor, which is located in the passenger compartment, has been proposed (e.g., Japanese Laid-Open Patent Publication No. 11-78693). By using the prior art vehicle monitoring apparatus, the driver can easily check the surrounding of the vehicle from the driver's seat.

It is preferred that the area of the picture generated by the imaging apparatus be as wide as possible. Thus, the employment of a wide-angle lens or the employment of a motor, which moves the imaging apparatus, has been proposed to generate images of wide areas.

However, the maximum view angle of the wide-angle lens is not large. Further, the employment of the wide-angle lens increases costs. The employment of a motor to move the imaging apparatus increases costs. In addition, the motor enlarges the imaging apparatus, which in turn, increases the space occupied by the imaging apparatus.

To widen the imaging area, the imaging apparatus must be projected from the vehicle body. This lowers the aesthetic appeal of the vehicle. Further, a stay or bracket becomes necessary when projecting the imaging apparatus from the vehicle body. This increases the number of components.

SUMMARY OF THE INVENTION

It is an object to provide a vehicle imaging apparatus that generates a picture of a wide area in an inexpensive manner without lowering the aesthetic appeal, a vehicle monitoring apparatus that employs such imaging apparatus, and a rearview mirror incorporating such imaging apparatus.

To achieve the above object, the present invention provides a vehicle imaging apparatus for generating a picture of a predetermined area outside a vehicle having a rearview mirror. The vehicle imaging apparatus includes a reflection mirror arranged in the rearview mirror and having a curved surface. An imaging device is arranged in the rearview mirror to generate a picture from an image reflected on the reflection mirror.

A further perspective of the present invention is a vehicle monitoring apparatus for monitoring a predetermined area outside a vehicle having a rearview mirror. The vehicle monitoring apparatus includes a vehicle imaging apparatus arranged in the rearview mirror. The vehicle imaging apparatus includes a reflection mirror having a curved surface and an imaging device for generating a picture from an image reflected on the reflection mirror. A processor receives the picture from the imaging device and processes the picture. A display is connected to the processor to display a processing result of the processor. The processor selects a certain section of the picture in accordance with a driving condition of a vehicle and shows the selected section on the display.

A further perspective of the present invention is a rearview mirror of a vehicle. The rearview mirror includes a reflection mirror having a curved surface. An imaging device generates a picture from an image reflected on the reflection mirror.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
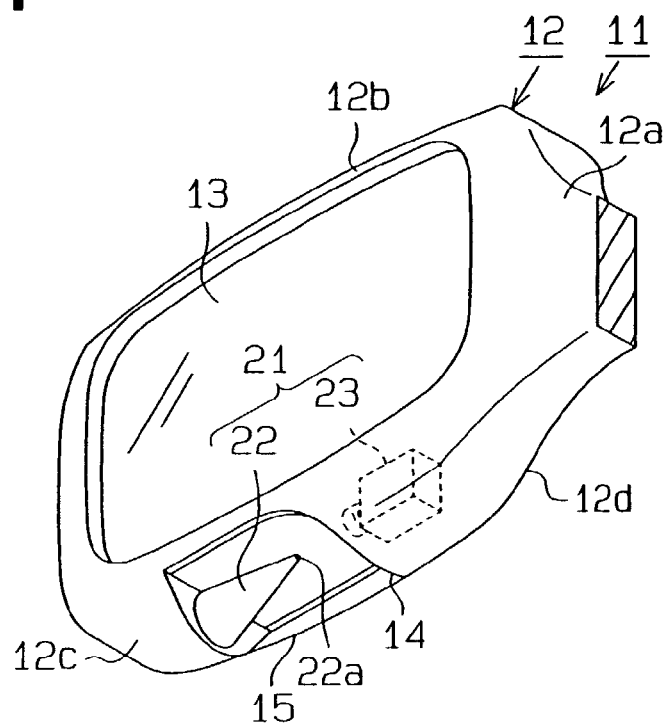
FIG. 1 is a perspective view showing a rearview mirror incorporating a vehicle imaging apparatus according to a preferred embodiment of the present invention.

FIG. 1 is a perspective view showing a rearview mirror 11 incorporating a vehicle imaging apparatus according to a preferred embodiment of the present invention. As shown in FIG. 1, a rearview mirror 11, which is located on the passenger side of a vehicle (in the preferred embodiment, left rearview mirror of a right-side steering wheel vehicle), includes a housing 12 and a mirror body 13. The housing 12 has a basal portion 12a, which is attached to a passenger side door (not shown). The mirror body 13 is fitted in a rear side 12b of the housing 12 so that the mirror body 13 reflects the rearward side of the vehicle.

The housing 12 has lower portion 12c in which an opening 14 is formed. The opening 14 extends from the rear side 12b to the front side 12d of the housing 12. A transparent cover 15, which is made of a transparent resin, covers the opening 14.

Figure 2:
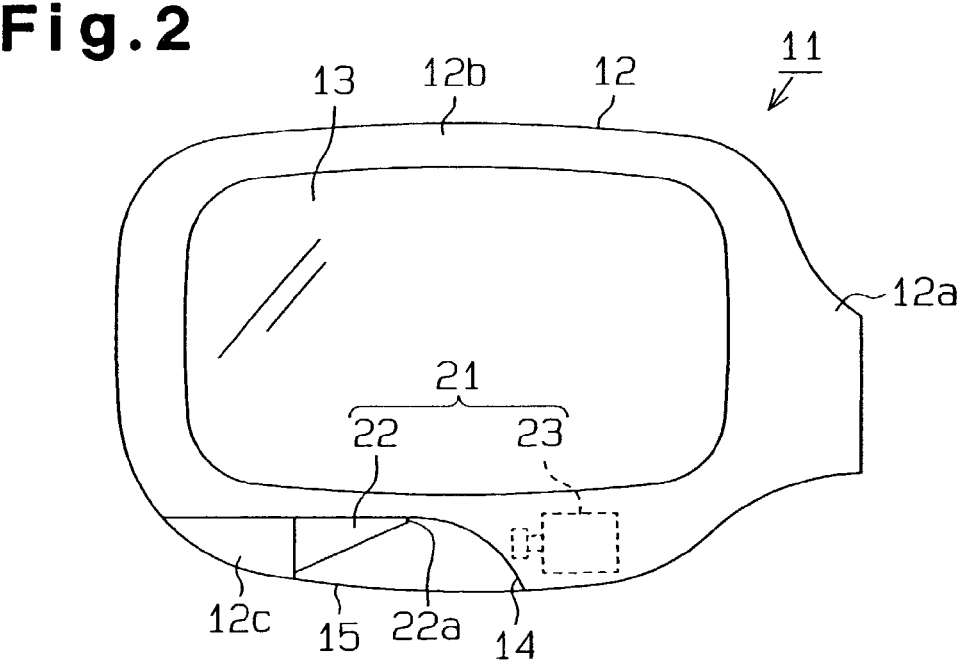
FIG. 2 is a rear view showing the rearview mirror of FIG. 1.

Referring to FIG. 2, an imaging apparatus 21 is arranged in the opening 14. The imaging apparatus 21 includes a reflection mirror 22 and an imaging device, or CCD camera 23. Instead of the CCD camera 23, any type of imaging device, such as an infrared camera, may be used as the imaging device.

Figure 3A:
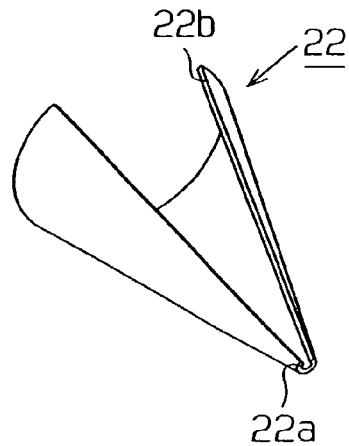
FIG. 3A is a perspective view showing a mirror body of the rearview mirror of FIG. 1.
Figure 3B:
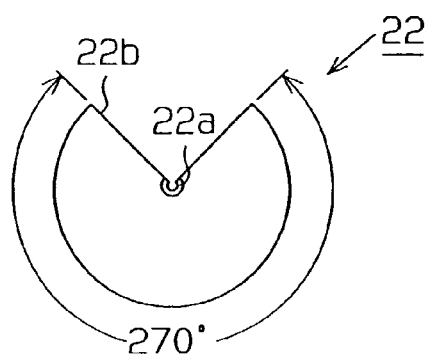
FIG. 3B is a front view showing the mirror body of FIG. 3A.

As shown in FIG. 3A, the reflection mirror 22 has a continuously curved mirror surface. The reflection mirror 22 is generally conical and partially cutaway. Referring to FIG. 3B, the reflection mirror 22 has a bottom end defining an arc extending within an angular range of about 270°. In the preferred embodiment, the term generally conical refers to an incomplete conical shape obtained by cutting away part of a cone. As viewed in FIGS. 1 and 2, the reflection mirror 22 is arranged so that its apex 22a extends toward the basal portion 12a of the housing 12 and its cutaway portion 22b extends upward. As shown in FIG. 2, the reflection mirror 22 is arranged so that its mirror surface is exposed and so that its upper portion, or cutaway portion 22b, is covered by the housing 12. In other words, the upper portion of the reflection mirror 22 is covered by the housing 12 and the remaining portion of the reflection mirror 22 is exposed.

As shown in FIGS. 1 and 2, the CCD camera 23 is arranged in the housing 12 facing the distal side of the housing 12 and the mirror surface of the reflection mirror 22. The CCD camera 23 generates a picture from an image reflected on the surface of the reflection mirror 22. The CCD camera 23 is arranged closer the basal portion 12a of the housing 12 than the reflection mirror 22.

Figure 4A:
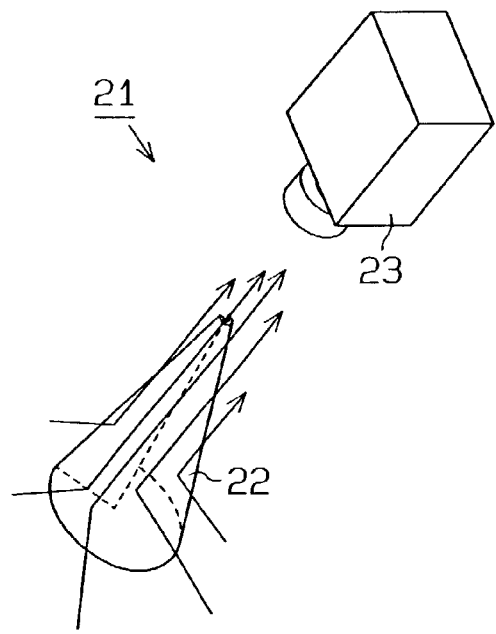
FIG. 4A illustrates the reflection area of the mirror surface of reflection mirror 22 relative to the CCD camera 23.
Figure 4B:
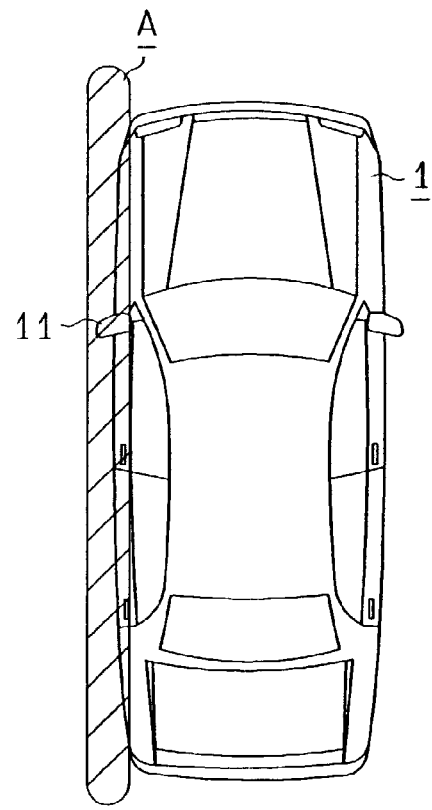
FIG. 4B is a plan view showing an imaging area of the imaging apparatus incorporated in the rearview mirror of FIG. 1.

When the CCD camera 23 generates a picture of the surface of the reflection mirror 22, the mirror surface reflects a wide area around the reflection mirror 22, as shown in FIG. 4A. Thus, the CCD camera 23 generates a picture of the wide area. More specifically, referring to FIGS. 4B, 7, and 8, the CCD camera 23 generates a picture of an imaging area, or a predetermined area A located beside the passenger side of the vehicle 1.

Figure 5A:
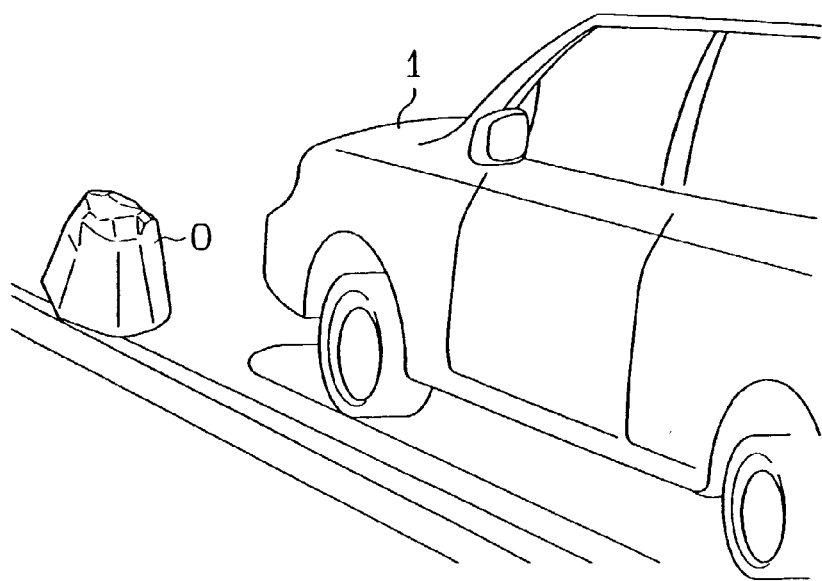
FIGS. 5A and 5B are schematic perspective views showing the surrounding of a vehicle.
Figure 5B:
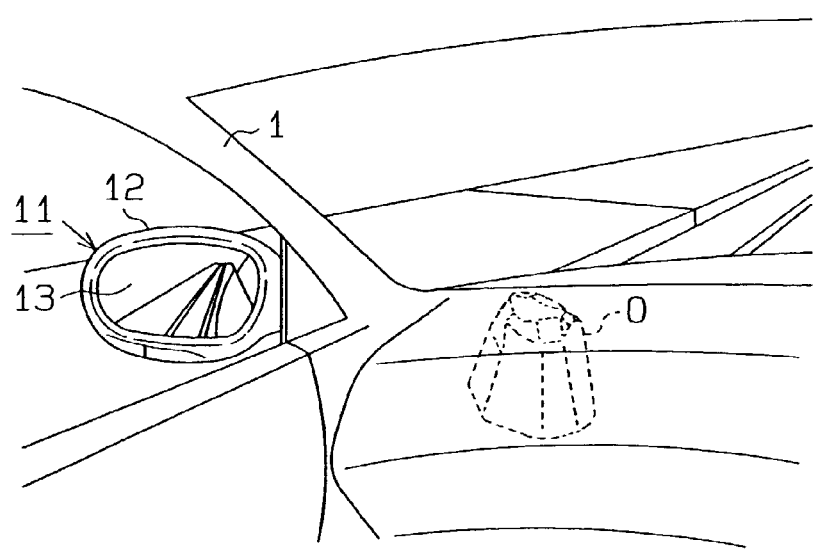

Accordingly, even if an obstacle O exists beside the vehicle in a driver's blind spot as shown in FIGS. 5A and 5B, a picture of the obstacle O is generated as shown in FIGS. 7 and 8. The imaging apparatus 21 generates a picture of area A, which includes the driver's blind spots.

The imaging apparatus 21 is incorporated in a vehicle monitoring apparatus 31, which monitors the surrounding of a vehicle.

Figure 6:
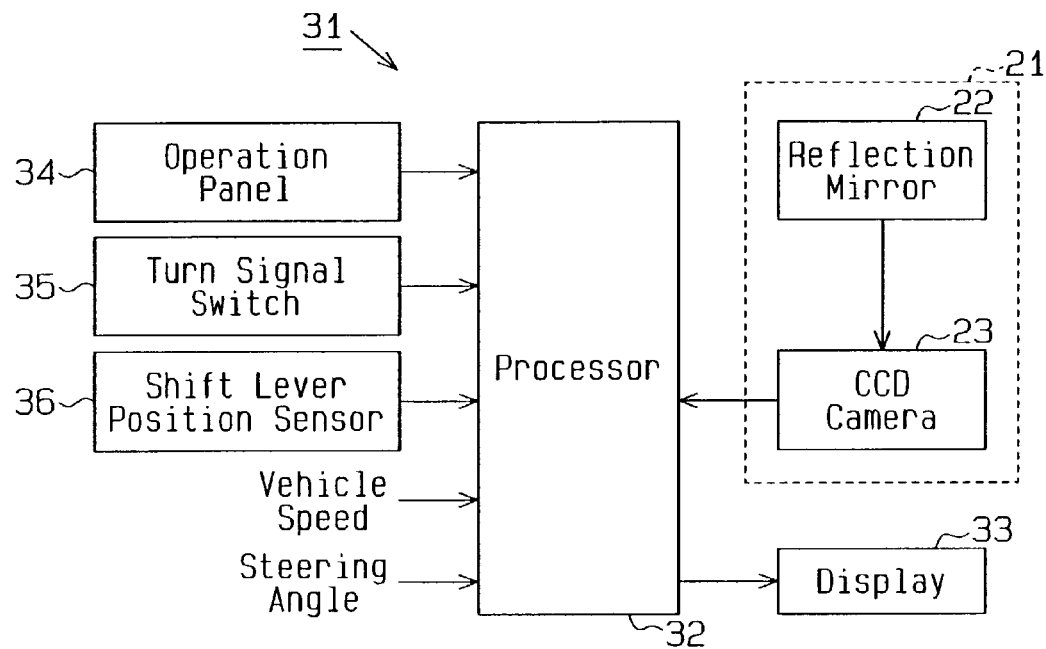
FIG. 6 is a schematic block diagram of a vehicle monitoring apparatus according to a preferred embodiment of the present invention.

With reference to FIG. 6, the vehicle monitoring apparatus 31 includes the imaging apparatus 21, a processor 32, and a display 33.

The display 33 may be a liquid crystal monitor arranged on a room mirror, a head-up display, or a navigation system screen. Further, the display 33 is connected to the processor 32.

Figure 7A:
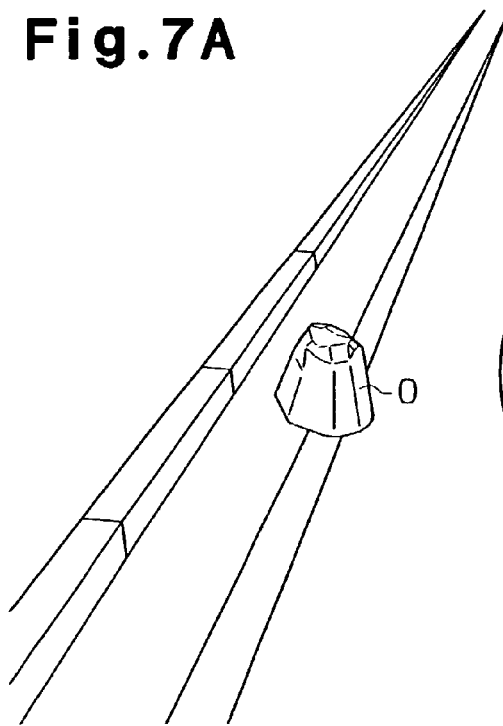
FIG. 7A is a perspective view showing an imaging subject of the vehicle monitoring apparatus of FIG. 6.
Figure 7B:
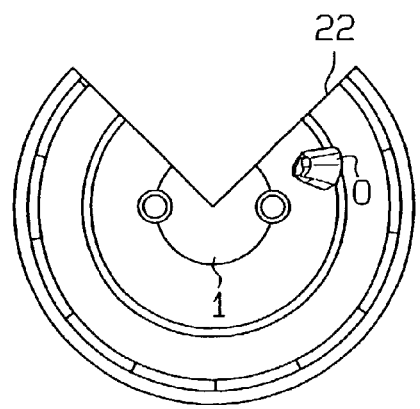
FIG. 7B is a schematic explanatory diagram of a picture taken by the imaging apparatus in the vehicle monitoring apparatus of FIG. 6.

The processor 32 is a CPU unit, which includes a CPU, a ROM, and a RAM (not shown), and receives image data of a pictures generated by the CCD camera 23. As shown in FIG. 7B, the picture generated by the CCD camera 23 is curved along the surface of the reflection mirror 22 and differs significantly from the actual state, which is shown in FIG. 7A. Thus, the processor 32 performs a correction process on the picture generated by the CCD camera 23 to obtain a picture that is close to the actual state.

When receiving the image data of FIG. 7B, the processor 32 performs a first correction process to decrease the curvature of the curved picture. The CCD camera 23 then reverses the picture taken from the reflection mirror 22. That is, the processor 32 performs a second correction process on the image that has undergone the first correction process. The picture that has undergone the second correction process is close to the actual state.

Figure 8A:
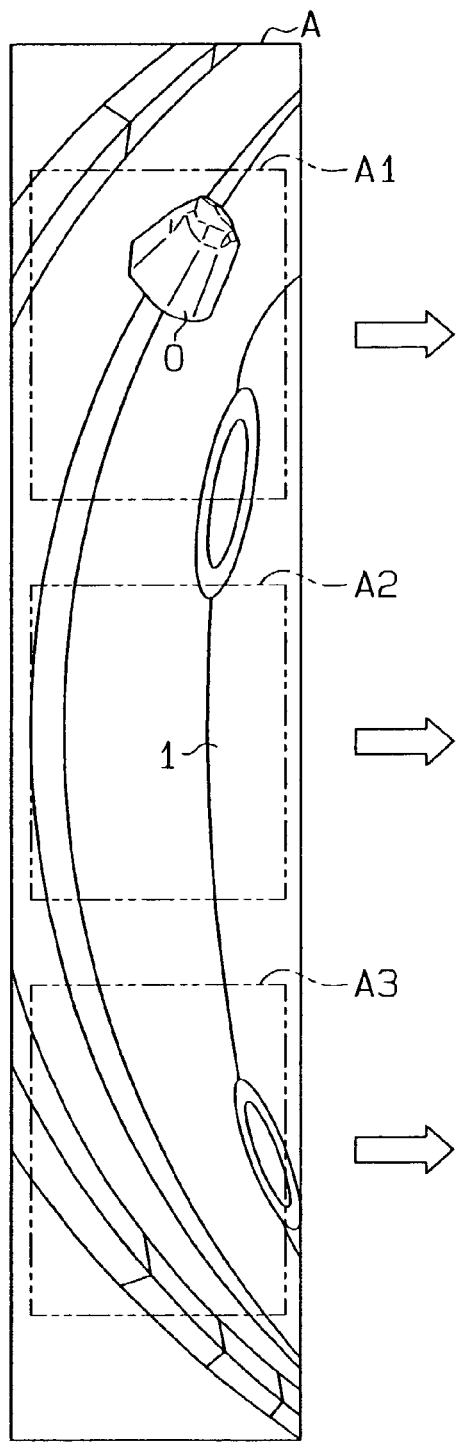
FIGS. 8A and 8B are schematic explanatory diagrams of a picture processed by a processor of the vehicle monitoring apparatus of FIG. 6.
Figure 8B:
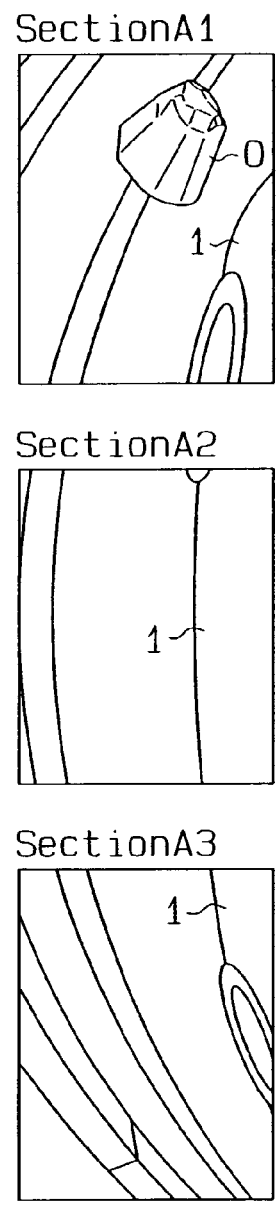

From the entire area A of the picture that has undergone the second correction process, the processor 32 selects a certain section and shows the selected section on the display 33, as shown in FIGS. 8A and 8B. The processor 32 selects the section that is to be displayed on the display 33 in accordance with the driving condition of the vehicle. In the preferred embodiment, one of three sections is selected. The first section A1 corresponds to the area close to the front of the vehicle, the second section A2 corresponds to the area close to the middle of the vehicle, and the third area A3 corresponds to the area close to the rear of the vehicle.

With reference to FIG. 6, the processor 32 is electrically connected to an operation panel 34, which is located near the driver's seat in the passenger compartment, a turn signal switch 35, and a shift lever position sensor 36. The processor 32 also receives information indicated the vehicle velocity or the steering angle of the vehicle. When the vehicle is not moving and the shift lever position is in the driving range (i.e., the "D" range, the "2" range, or the "L" range), that is, when the vehicle is about to be moved forward, the processor 32 selects the first section A1. The processor 32 also selects the first section A1 when the vehicle is moving forward and the vehicle velocity is less than a predetermined velocity.

If the turn signal switch 35 is operated to indicate a left turn and the steering angle indicates that the vehicle is turning left, the processor 32 selects the second section A2. When the shift lever position is in the reverse range (the "R" range), that is, when moving the vehicle toward the rear, the processor 32 selects the third section A3.

In the preferred embodiment, the processor 32 switches the section that is to be shown on the display 33 in accordance with the manipulation of the operation panel 34 regardless of the driving condition of the vehicle.

The vehicle imaging apparatus 21 and the vehicle monitoring apparatus 31 of the preferred embodiment has the advantages described below.

(1) The reflection mirror 22 has a curved surface. Thus, the reflection mirror 22 reflects a wide area. The CCD camera 23 generates a picture from the reflection of the wide area on the reflection mirror 22. Although the reflection mirror 22 reflects a wide area, the reflection mirror 22 is less expensive in comparison with a wide-angle lens or a motor that moves the CCD camera 23.

The imaging apparatus 21 is arranged in the rearview mirror 11, which projects from the vehicle body. This guarantees the generation of a picture showing a wide area (predetermined area A) beside the vehicle. Since the imaging apparatus 21 does not solely project from the vehicle body, the aerodynamic characteristic of the vehicle and the aesthetic appeal of the vehicle are not affected. Further, the imaging apparatus 21 is arranged in the rearview mirror 11. Thus, the rearview mirror 11 protects the imaging apparatus 21 from impacts and prevents the imaging apparatus 21 from being damaged. By arranging the imaging apparatus 21 in the rearview mirror 11, the point where the imaging apparatus 21 generates a picture is located near a point that the driver actually views. Thus, the picture generated by the imaging apparatus 21 closely corresponds to the point the driver views. This enables the driver to easily recognize the surrounding of the vehicle.

(2) The imaging apparatus 21 is arranged in the lower portion 12c of the passenger side rearview mirror 11. This enables the generation of pictures including the driver's blind spots that are located beside the passenger seat.

(3) The upper portion of the reflection mirror 22 is covered by the housing 12. This restricts the lights that reach the reflection mirror 22, and light from an upward direction does not reach the reflection mirror 22. Thus, intense light, such as direct sunlight, is prevented from reaching the reflection mirror 22 and clear images are prevented from being dimmed by such light. Accordingly, the CCD camera 23 generates clear pictures on the display 33.

(4) The reflection mirror 22 is generally conical. The apex of the reflection mirror 22 is faced toward the basal portion of the rearview mirror 11. Further, the reflection mirror 22 is located closer to the distal portion of the rearview mirror 11 than the CCD camera 23. Thus, the reflection mirror 22 reflects a wide area including the side surface of the vehicle, and the CCD camera 23 generates a picture of the wide area, which includes the side surface of the vehicle. Accordingly, the driver recognizes the surrounding of the vehicle using the vehicle as a criterion.

(5) The processor 32 selects predetermined sections from the picture generated by the imaging apparatus 21. Thus, the display 33 only shows the section of the picture, which is generated by the imaging apparatus 21, that should be checked in accordance with the driving condition of the vehicle. Accordingly, the section shown on the display 33 is large enough to be checked, and burdensome procedures for finding the section that should be checked do not have to be performed.

(6) The processor 32 performs a correction process for decreasing the curvature of the curved picture generated by the imaging apparatus. Thus, a picture resembling the actual state is shown on the display 33. This enables the driver to easily check for obstacles beside the vehicle.

It should be apparent to those skilled in the art that the present invention may be embodied in many other specific forms without departing from the spirit or scope of the invention. Particularly, it should be understood that the present invention may be embodied in the following forms.

The reflection mirror 22 does not have to be conical as long as it is curved. For example, the reflection mirror 22 may be spherical or convex.

The upper portion of the reflection mirror 22 does not necessarily have to be covered by the housing 12.

The reflection mirror 22 may be arranged closer to the basal portion of the rearview mirror 11 than the CCD camera 23.

The angular range of the arc defined by the bottom end does not have to be 270° and may be a smaller or larger angle. Further, the reflection mirror 22 may be formed as a complete cone.

The processor 32 may perform the first and second correction processes after selecting the section that should be shown on the display 33. Further, the processor 32 does not necessarily have to perform the first and second correction processes.

The imaging apparatus 21 may be arranged in any exterior mirror of the vehicle. For example, the imaging apparatus may be arranged in a rearview mirror located on the driver's seat side of the vehicle or in a mirror installed on the fender of the vehicle.

The present examples and embodiments are to be considered as illustrative and not restrictive, and the invention is not to be limited to the details given herein, but may be modified within the scope and equivalence of the appended claims.

What is claimed is:

1. A vehicle imaging apparatus for generating a picture of a predetermined area outside a vehicle having a rearview mirror, wherein the rearview has a housing and is located on the passenger side of the vehicle, wherein the housing includes an opening located at a lower portion of the rearview mirror and extending from a rear side to a front side of the housing, and wherein the opening is covered by a transparent cover, the vehicle imaging apparatus comprising:
    a reflection mirror arranged in the housing of the rearview mirror and having a curved surface; and
    an imaging device arranged in the opening of the housing of the rearview mirror to generate a picture from an image reflected on the reflection mirror, wherein the reflection mirror is arranged in the opening of the housing of the rearview mirror so that an upper portion of the reflection mirror is covered by the housing and a portion excluding the upper portion is exposed, and wherein the reflection mirror is generally conical, has an apex facing a basal portion of the rearview mirror, and is located closer to a distal end of the rearview mirror than the imaging device.

2. A vehicle monitoring apparatus for monitoring a predetermined area outside a vehicle having a rearview mirror, wherein the rearview mirror has a housing and is located on the passenger side of the vehicle, wherein the housing includes an opening located at a lower portion of the rearview mirror and extending from our rear side to a front side of the housing, and wherein the opening is covered by a transparent cover, the vehicle monitoring apparatus comprising:
    a vehicle imaging apparatus arranged in the rearview mirror, wherein the vehicle imaging apparatus includes a reflection mirror arranged in the housing of the rearview mirror and having a curved surface and an imaging device arranged in the opening of the housing of the rearview mirror, for generating a picture from an image reflected on the reflection mirror, wherein the reflection mirror is arranged in the opening of the housing of the rearview mirror so that an upper portion of the reflection mirror is covered by the housing and a portion excluding the upper portion is exposed, and wherein the reflection mirror is generally conical, has an apex facing a basal portion of the rearview mirror, in is located closer to a distal end of the rearview mirror than the imaging device;
    a processor for receiving the picture from the imaging device and processing the picture; and
    a display connected to the processor to display a processing result of the processor;
    wherein the processor selects a certain section of the picture in accordance with a driving condition of a vehicle and shows the selected section on the display.

3. The vehicle monitoring apparatus according to claim 2, wherein the processor selects a first section corresponding to an area close to the front of the vehicle when the vehicle is moved toward the front, a second section corresponding to an area close to the middle of the vehicle when the vehicle is turned in the direction of the passenger side of the vehicle, and a third area corresponding to an area close to the rear of the vehicle when the vehicle is moved toward the rear.

4. The vehicle monitoring apparatus according to claim 2, wherein the processor performs a correction that decreases the curvature of a curved portion of the picture.

5. A rearview mirror located on the passenger side of a vehicle comprising:
    a housing including an opening located at a lower portion of the rearview mirror and extending from a rear side to a front side of the housing;

a transparent cover for covering the opening;
a reflection mirror arranged in the housing and having a curved surface; and
an imaging device arranged in the opening of the housing, for generating a picture from an image reflected on the reflection mirror, wherein the reflection mirror is arranged in the opening of the housing so that an upper portion of the reflection mirror is covered by the housing and a portion excluding the upper portion is exposed, and wherein the reflection mirror is generally conical, has an apex facing a basal portion of the rearview mirror, and is located closer to the distal end of the rearview mirror than the imaging device.

* * * * *